US00RE38328E

(19) United States
(12) Reissued Patent
Gueret

(10) Patent Number: US RE38,328 E
(45) Date of Reissued Patent: Nov. 25, 2003

(54) PACKAGING AND DISPENSING DEVICE

(75) Inventor: Jean-Louis H. Gueret, Paris (FR)

(73) Assignee: L'Oreal, Paris (FR)

(21) Appl. No.: 09/709,714

(22) Filed: Nov. 13, 2000

Related U.S. Patent Documents

Reissue of:
(64) Patent No.: 5,833,121
Issued: Nov. 10, 1998
Appl. No.: 08/688,166
Filed: Jul. 29, 1996

(30) Foreign Application Priority Data

Aug. 10, 1995 (FR) ..... 95 09730

(51) Int. Cl.[7] ..... B67D 5/60
(52) U.S. Cl. ..... 222/144.5; 222/494; 222/1
(58) Field of Search ..... 222/94, 95, 1, 222/129, 135, 142.6, 142.9, 144.5, 206, 212, 265, 266, 490, 494; 215/260, 316; 220/203.11

(56) References Cited

U.S. PATENT DOCUMENTS

| | | | | |
|---|---|---|---|---|
| 830,001 A | * | 9/1906 | Pitt | 215/6 |
| 1,092,433 A | * | 4/1914 | Cox | 222/144.5 |
| 2,684,789 A | * | 7/1954 | Marchant | 222/212 |
| 3,076,573 A | | 2/1963 | Thomas | 215/6 |
| 3,204,836 A | | 9/1965 | Joffe | 222/545 |
| 4,705,192 A | | 11/1987 | Knapton | 222/144.5 |
| 4,838,457 A | | 6/1989 | Swahl et al. | 222/48 |
| 4,893,729 A | | 1/1990 | Iggulden et al. | 222/42 |
| 4,949,874 A | * | 8/1990 | Fiedler et al. | 222/135 |
| 4,993,594 A | | 2/1991 | Becker et al. | 222/48 |
| 5,009,342 A | | 4/1991 | Lawrence et al. | 222/136 |
| 5,353,964 A | | 10/1994 | Liu et al. | 222/134 |
| 5,387,200 A | * | 2/1995 | Kronstadt | 239/305 |
| 5,411,176 A | | 5/1995 | Favre | 222/94 |

FOREIGN PATENT DOCUMENTS

| | | |
|---|---|---|
| CH | 539551 | 7/1973 |
| DE | 24 44 227 A | 3/1976 |
| DE | 30 11 634 A1 | 10/1981 |
| EP | 0421860 | 4/1991 |
| EP | 0 427 609 A1 | 5/1991 |
| EP | 0427629 | 5/1991 |
| EP | 0649795 | 4/1995 |
| FR | BE 429076 A | 7/1938 |
| FR | 2 697 233 A1 | 4/1994 |

* cited by examiner

*Primary Examiner*—Ehud Gartenberg
*Assistant Examiner*—Patrick Buechner
(74) *Attorney, Agent, or Firm*—Finnegan, Henderson, Farabow, Garrett & Dunner, LLP

(57) ABSTRACT

The invention relates to a device for packaging and dispensing substances in the form of a liquid, a gel, or a paste form, the device comprising a receptacle having a plurality of compartments for separately storing at least two substances, each compartment having an outlet for the substance, the device further comprising fixing means for fixing a rotary dispensing head on the receptacle to enable the substance contained in a selected compartment corresponding to a predetermined angular position of the head to be dispensed. Said dispensing head has a single dispensing channel provided at its outlet end with a non-return valve suitable for opening under the effect of thrust from upstream substance, and it is shaped to establish selective communication between the outlet of said selected compartment and said dispensing channel and/or to exert selective action on means for extracting substance and associated with said selected compartment.

61 Claims, 3 Drawing Sheets

PACKAGING AND DISPENSING DEVICE

Matter enclosed in heavy brackets [ ] appears in the original patent but forms no part of this reissue specification; matter printed in italics indicates the additions made by reissue.

The present invention relates to a device for packaging and dispensing substances that are in liquid, gel, or paste form, and particularly, but not exclusively, a device for packaging and dispensing a plurality of cosmetic substances for providing protection against exposure to the sun, and having different protection (screen) factors.

BACKGROUND OF THE INVENTION

German patent application No. 2 444 227 discloses a device for packaging and dispensing two liquid substances, the device comprising a two-compartment receptacle for storing the substances separately, each compartment having a substance outlet opening, and the device having means for fixing a rotary dispensing head on the receptacle enabling the substance contained in a selected compartment corresponding to a predetermined angular position of the head to be dispensed. In that device, the substances are discharged via two respective dispensing channels which open out side by side. Such a device does not provide entire satisfaction, in particular because foreign bodies such as sand or dust can penetrate into the receptacle when it sucks in air as it returns to its initial shape after dispensing substance. In addition, after prolonged use of one only of the substances, the other substance contained in the associated dispensing channel can dry out or spoil in contact with air.

OBJECTS AND SUMMARY OF THE INVENTION

A particular object of the present invention is to remedy those drawbacks.

This is achieved by the present invention which provides a device for packaging and dispensing substances in liquid, gel, or paste form, the device comprising a receptacle having a plurality of compartments for separately storing at least two substances, each compartment having an outlet for the substance, the device further comprising fixing means for fixing a rotary dispensing head on the receptacle to enable the substance contained in a selected compartment corresponding to a predetermined angular position of the head to be dispensed, wherein said dispensing head includes a single dispensing channel provided at its outlet end with a non-return valve suitable for opening under the effect of thrust from upstream substance, and wherein said dispensing head is shaped to establish selective communication between the outlet of said selected compartment and said dispensing channel and/or for exerting selective action on means for extracting substance and associated with said selected compartment.

Advantageously, said non-return valve is of the type that allows ingress of air.

The invention prevents foreign body pollution of the substances contained inside the receptacle, and in the event of prolonged use of one only of the substances, stagnation of the other substance in the dispensing channel is avoided. This reduces the risk of the dispensing channel clogging or of the substance spoiling on contact with air.

When the thrust exerted on the non-return valve by the substance ceases, then the substance contained in the dispensing channel is advantageously returned to the associated compartment by the suction that accompanies return of the device to its initial state. This avoids the substances in the two compartments mixing in the dispensing channel when subsequently dispensing the substance contained in the other compartment.

When the packaging and dispensing device is used for packaging cosmetics for providing protection against exposure to the sun, the user can advantageously have available a plurality of substances of different protection factors or a substance for protection against exposure to the sun and an after-sun lotion such as a hydrating cream, in the form of a single bottle or tube.

The term "receptacle" should not be understood restrictively, but is used to cover any type of container whether a single piece or made up by assembling a plurality of unit containers side by side, in which case said "compartments" correspond, in fact, to said unit containers.

In a particular embodiment of the invention, the rotary dispensing head can take up an angular position in which it closes the device, said channel then being isolated from said openings. Since the device is opened or closed by rotating the dispensing head without separating the parts of the device, problems associated with losing the top or with foreign bodies such as sand penetrating and then making closure difficult, as are encountered with prior art tubes and bottles, are avoided.

In a particular embodiment of the invention, said fixing means for fixing the rotary head on the receptacle comprise a cover having an outlet tubular skirt for snapping onto the receptacle, and a neck for rotatably receiving the head, the cover also having orifices passing therethrough and communicating respectively in sealed manner with said outlets of said compartments and opening out to the inside of the neck at locations that are angularly spaced apart. Advantageously, said orifices are constituted by recesses formed in the inside face of the neck at its base, and the cover includes annular sealing lips that engage in said openings respectively when the cover is in position on the receptacle.

In a particular embodiment of the invention, the receptacle includes at least one flexible wall shaped to enable the user to expel the substance contained in a compartment by applying pressure to said wall. Advantageously, said flexible wall is elastically deformable, and at rest is in the form of a hemisphere that projects from the outside surface of the receptacle.

In a particular embodiment of the invention, said fixing means for fixing the rotary dispensing head on the receptacle enable the head to move axially along its axis of rotation, and said outlets for substance are situated on hollow control rods which, by being depressed, act on extraction means suitable for causing substance to be expelled, the head having a bearing surface shaped so as to press axially against only one of the control rods at a time.

In a particular embodiment of the invention, said control rods are associated with respective pumps suitable for dispensing a measured quantity of substance on each depression of the control rod.

In a particular embodiment of the invention, said non-return valve is made by overmolding an elastomer material.

Preferably, the non-return valve is situated substantially flush with the outside surface of the dispensing head. Thus, the substance leaving the non-return valve during dispensing can accumulate on the outside surface of the dispensing head before being taken off by the user, either by using the fingers or by placing it directly on that part of the body where the substance is to be applied.

A device of the kind specified above is advantageously used for packaging and dispensing two cosmetics for providing protection against exposure to the sun, having different protection factors, or a substance for providing protection against exposure to the sun together with an after-sun lotion.

Nevertheless, it would not go beyond the ambit of the invention to use a device as specified above for successively applying two treatment substances, for example where one of the substances needs to be applied in the morning and the other in the evening.

BRIEF DESCRIPTION OF THE DRAWINGS

Other characteristics and advantages of the present invention appear on reading the following detailed description of three non-limiting embodiments of the invention, and on examining the accompanying drawings, in which.

MORE DETAILED DESCRIPTION

Figure 1:
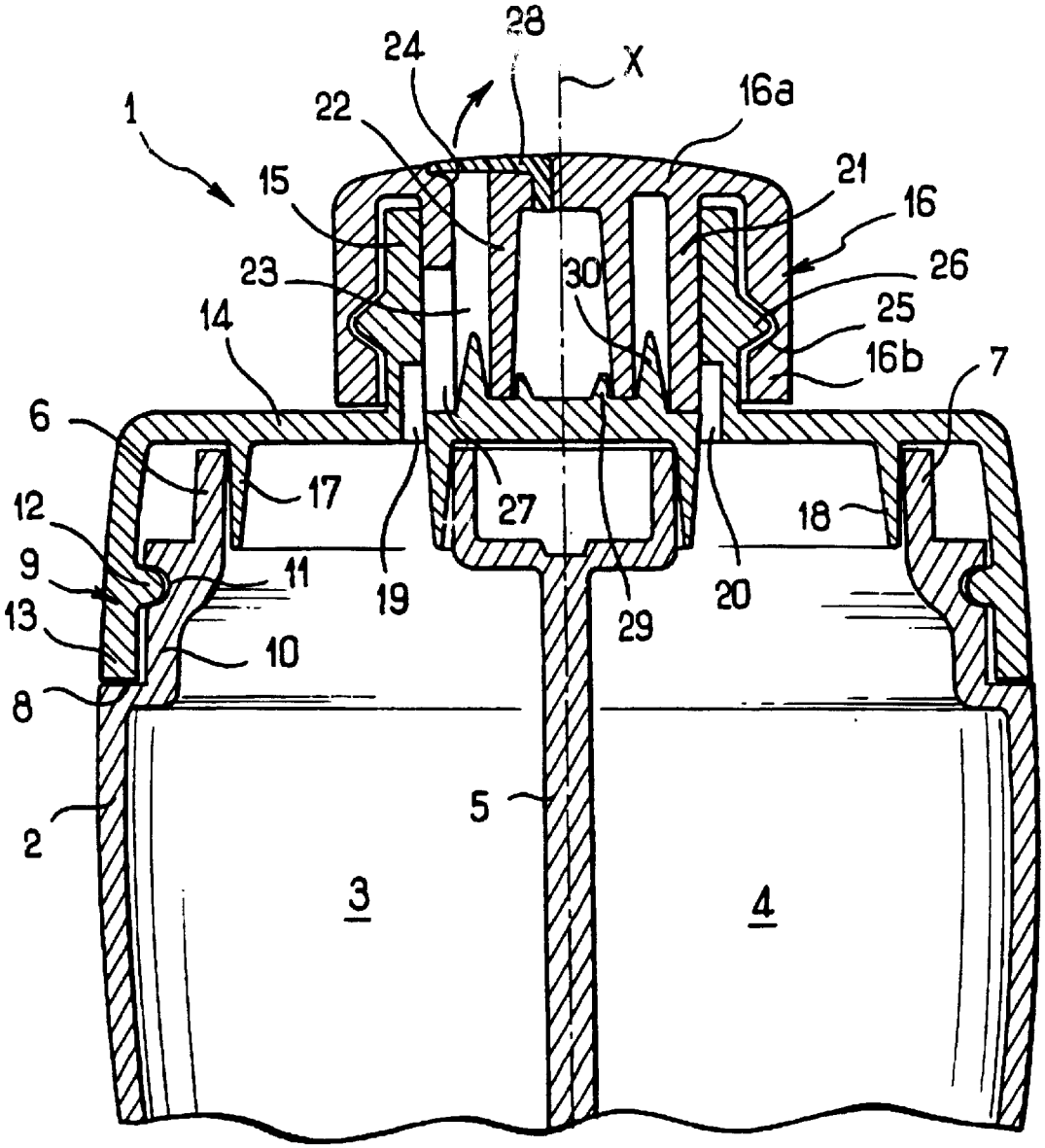
FIG. 1 is a fragmentary and diagrammatic axial section view of a packaging and dispensing device constituting a first embodiment of the invention.

FIG. 1 shows a packaging and dispensing device 1 constituting a first embodiment of the invention. The device 1 comprises a receptacle 2 having two compartments 3 and 4 designed to receive two lotions for providing protection against exposure to the sun, and having different protection factors. The receptacle 2 is made using any conventional technique for shaping plastics material, e.g. by injection blowing or by extrusion and heat sealing. The compartments 3 and 4 are separated by a partition 5 and they open out to the top end of the receptacle 2 via respective openings 6 and 7 having parallel axes and of circular cross-section.

On the outside, the receptacle 2 has a shoulder to define a setback 8 for securing a cover 9. The cover covers the openings 6 and 7 and the zone where the partition 5 connects to the region of the top wall of the receptacle that extends between the openings. The setback 8 is radially defined on the inside by a tubular wall 10 on the outside of which there is formed an annular groove 11. The groove 11 is intended to receive an annular bead 12 of complementary shape projecting radially inwards from a tubular skirt 13 formed on the bottom portion of the cover 9. The bead 12 is snapped into the groove 11. The top of the tubular skirt 13 runs into a wall 14 extending transversely to the axis of the tubular skirt 13, said wall 14 being extended upwardly by a neck 15 about an axis X and serving to receive a rotary endpiece or dispensing head 16. The axes of the openings 6 and 7 are parallel to the axis X. The wall 14 is provided on its bottom face with annular sealing lips 17 and 18 that fit in leakproof manner in the openings 6 and 7 respectively of the receptacle 2. Recesses 19 and 20 formed at the base of the neck 15 on its radially inside surface, and in the embodiment described in the form of rectilinear slots extending parallel to the axis X of the neck 15, have their bottom ends opening out in the openings 6 and 7 respectively and have their top ends opening out in the neck 15 at respective diametrically opposite locations.

On the outside, the dispensing endpiece 16 is defined by a top wall 16a that is dome-shaped and by a side wall 16b that is in the form of a tubular skirt, and on the inside it has two coaxial tubular skirts 21 and 22 whose top ends are connected to the inside face of the dome-shaped wall 16a. Between them, the tubular skirts 21 and 22 leave an annular space acting as a channel 23 through which substance can pass, opening out at its top end to the outside face of the wall 16a via a dispensing orifice 24. The side wall 16b is provided on its radially inner surface with an annular groove 25 that is snapped onto an annular bead 26 of complementary shape made on the radially outer surface of the neck 15.

The tubular skirt 21 situated between the wall 16b and the tubular skirt 22 is cut away in its periphery from its bottom end edge so as to form an opening 27 through which the substance leaving the recesses 19 or 20 can pass into the channel 23 (depending on the angular position of the dispensing endpiece 16).

When not dispensing substance, the dispensing orifice 24 is normally closed by a non-return valve 28, preferably of the type that allows air intake, made by overmolding an elastomer material on the wall 16a of the dispensing endpiece 16.

The transverse wall 14 has a first annular sealing lip 29 on its top face adjacent the radially inner surface of the tubular skirt 21 and a second annular sealing lip 30 extending between the tubular skirt 21 and the tubular skirt 22.

Depending on which substance is selected, the user turns the dispensing endpiece 16 about the axis X so as to cause the opening 27 of the annular skirt 21 to face the recess 19 or the recess 20 and thus dispense the substance contained in the compartment 3 or the compartment 4, respectively, or else the user places it in an intermediate position to close the device. After positioning the dispensing endpiece 16 as a function of the selected compartment, the user presses the wall of the receptacle 2 defining said compartment so as to dispense the substance contained therein, with the non-return valve 28 lifting under drive from the pressure in the substance. When the user releases the receptacle 2, the non-return valve 28 closes again because of its own resilience. When the receptacle 2 is made of an elastically deformable flexible material, the action of closing the non-return valve 28 is facilitated because of the suction that accompanies the return of the receptacle to its initial shape. During subsequent dispensing of the substance contained in the other compartment, this suction makes it possible to avoid the substances coming from the compartments 3 and 4 mixing in the channel 23.

Figure 2:
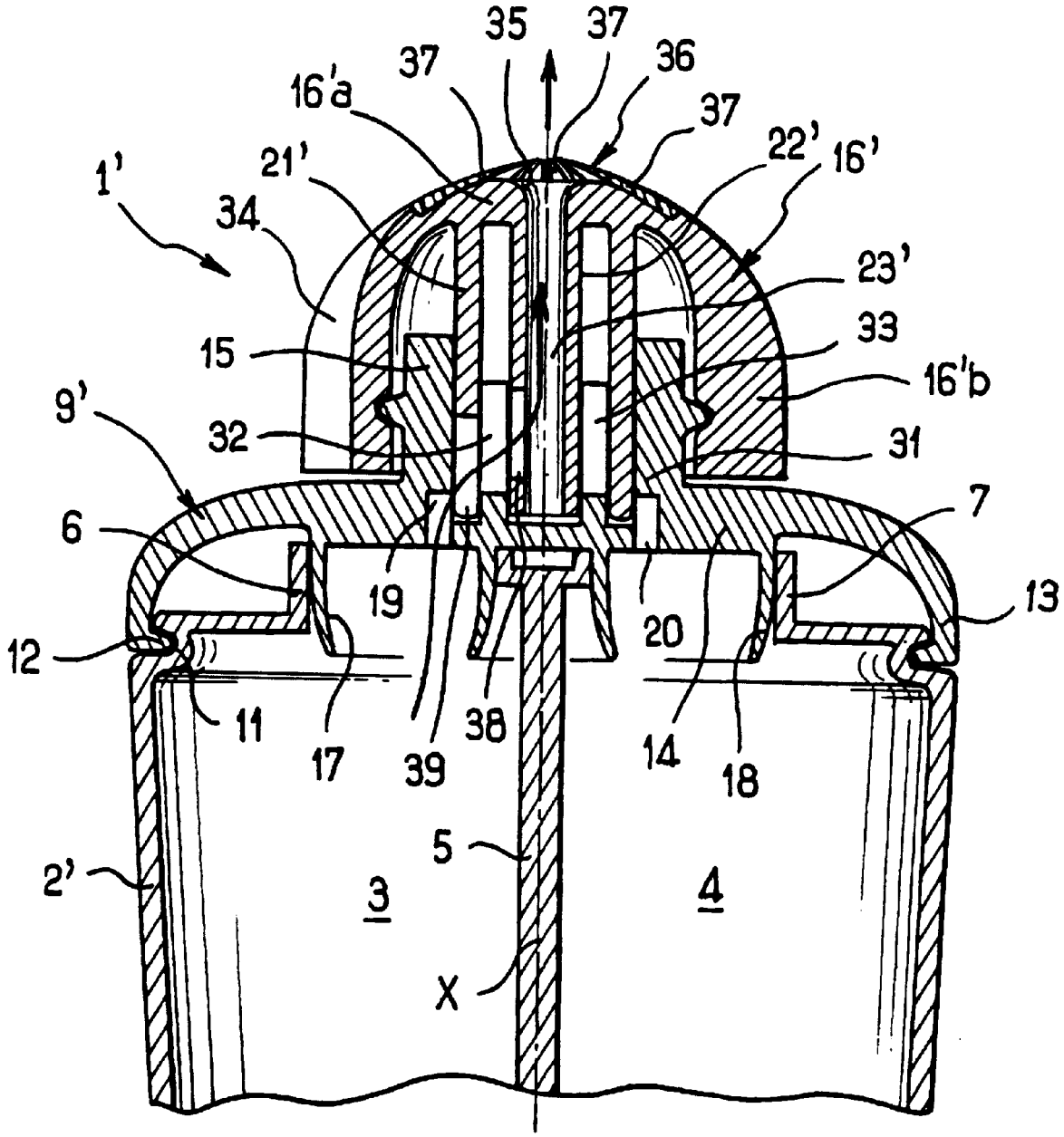
FIG. 2 is a fragmentary and diagrammatic axial section view of a packaging and dispensing device constituting a second embodiment of the invention.

FIG. 2 shows a packaging and dispensing device 1' constituting a second embodiment of the invention. For this embodiment and for the next embodiment, the same reference symbols are used to designate elements that are identical to those of the preceding embodiment, and they need not be described again in detail.

Overall the receptacle 2' has the same shape as the above-described receptacle 2, and the cover 9' differs from the previous cover mainly in the shape of the inside of the neck 15. The cover 9' has a tubular skirt 31 inside the neck, which skirt is cut away over two limited angular sectors of its periphery at two diametrically opposite locations to form two substance-passing openings 32 and 33.

The dispensing endpiece 16' mounted to rotate on the neck 15 about the axis X includes an outside wall 16b' from which there projects a rib 34 serving as a marker to indicate which compartment has been selected, and a top wall 16a' that is dome-shaped and that has a central outlet orifice 35 for the substance passing through the top thereof. A non-return valve 36 of elastomer material is made at the top of the wall 16a' by being overmolded thereon, and it is cut in a star configuration running from its center so as to form a plurality of flexible fingers 37 that touch one another at rest so as to close the valve in the absence of being subjected to upstream pressure of substance for dispensing, which fingers are suitable for deforming and spreading apart outwardly under the effect of pressure from substance to be dispensed. The dispensing endpiece 16' has two coaxial tubular skirts 21' and 22' on its inside which are connected via their tops to the inside face of the wall 16a'. The radially inner tubular skirt 22' defines an inside channel 23' through which substance passes and opening out at its top end via the orifice 35, with this skirt being open at its bottom end over a limited sector of its periphery to form an opening 38 through which substance passes into the channel 23'. The intermediate tubular skirt 21' fits in leakproof manner against the radially inner surface of the neck 15 above the recesses 19 and 20. It is cut open from its bottom end edge over a limited angular sector of its periphery to form an opening 39 for passing the substance coming from the recess 19 or 20 on its way to the channel 23' (after passing through the opening 32 or 33 and through the opening 38).

To dispense the substance, the user positions the marker 34 on the same side as the compartment 3 or the compartment 4 which contains the selected substance.

The opening 39 of the inner tubular skirt 21' is then situated either between the recess 19 and the opening 32 adjacent thereto, or else between the recess 20 and the opening 33 adjacent thereto. Substance is dispensed by pressing the wall of the receptacle defining the selected compartment 3 or 4. The substance flows through the opening 39 and the adjacent opening 32 or 33, the opening 38 of the inner tubular skirt 22', and thus reaches the dispensing orifice 35 via the channel 23'. The fingers of the non-return valve 37 splay apart under the effect of the pressure of the substance. When the user ceases to press on the receptacle, the resilience thereof tends to return it to its initial shape, thereby sucking back the substance contained in the channel 23'.

To close the device, the user positions the dispensing endpiece 16' in an intermediate angular position where both recesses 19 and 20 are isolated from the channel 23'.

Figure 3:
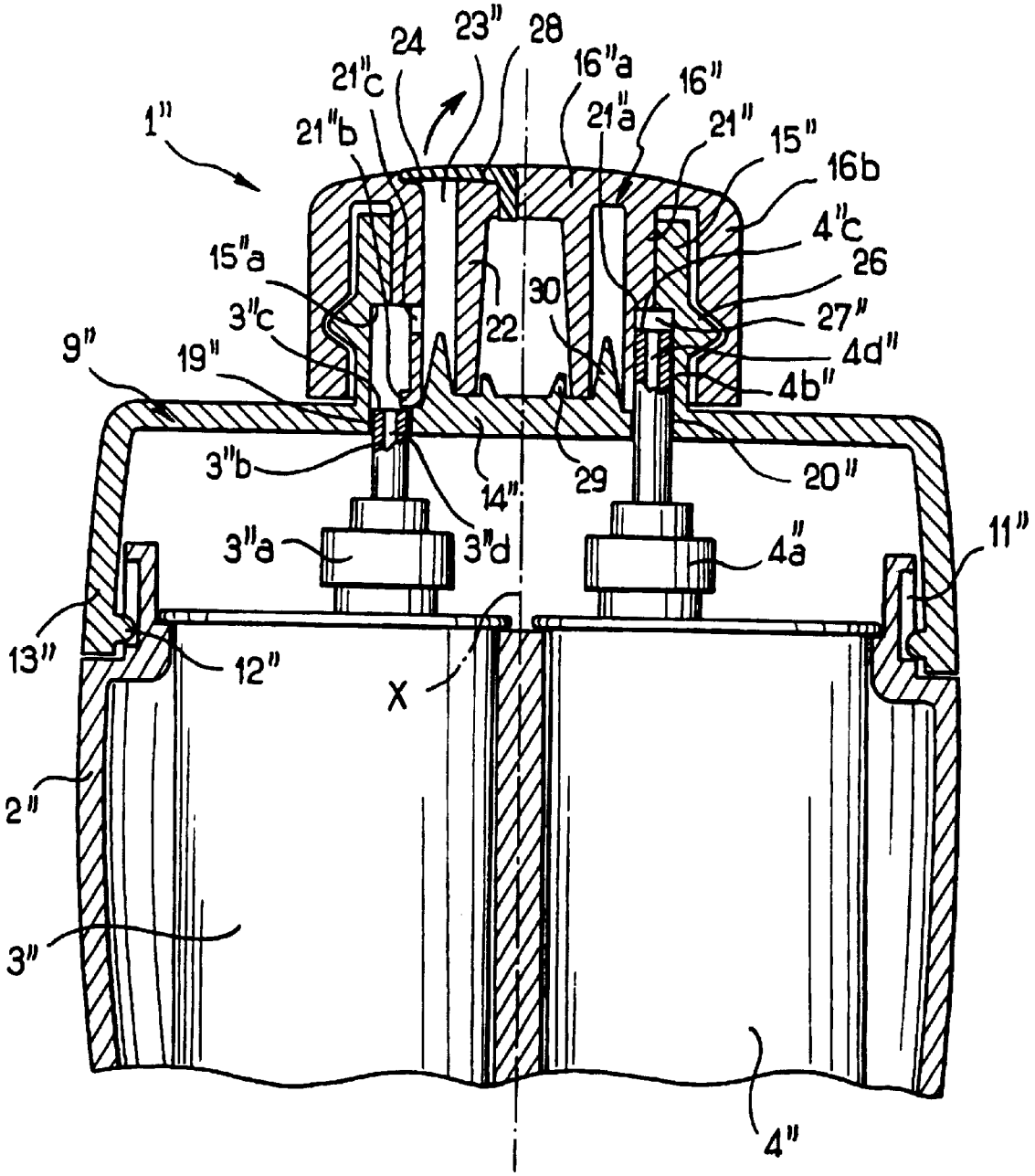
FIG. 3 is a fragmentary and schematic axial section view of a packaging and dispensing device constituting a third embodiment of the invention.

FIG. 3 shows a packaging and dispensing device 1" constituting a third embodiment of the invention.

The device 1" comprises a receptacle 2" housing two unit containers 3" and 4" filled with two respective substances for dispensing separately, e.g. two substances for providing protection against exposure to the sun and having different protection factors.

The containers 3" and 4" are provided at their top portions with pumps 3a" and 4a" (known per se) and shown diagrammatically, which pumps are provided with respective hollow control rods 3b" and 4b".

The pumps 3a" and 4a" may be of the type that does not allow ingress of air, and the containers 3" and 4" may be of the type in which the substance is packaged in a flexible bag that is capable of collapsing onto itself as the substance is dispensed.

The top portion of the receptacle 2" has a setback at the top thereof, and an annular groove 11" is formed in the radially outer surface of the setback for receiving a cap 9" on the receptacle 2" while leaving it free to slide along a predetermined stroke parallel to the axis X. The cap 9" has a tubular skirt 13" which is provided in the vicinity of its bottom end edge with an annular bead 12" that engages in the groove 11" to hold the cap 9" on the receptacle 2". The cap 9" is installed on the receptacle 2" by snap-fastening. The top portion of the tubular skirt 13" runs into a transverse wall 14" that extends generally perpendicularly to the axis X. The wall 14" is extended upwards by a neck 15" on which a dispensing head 16" is mounted to rotate about the axis X.

The control rods 3b" and 4b" pass through the wall 14" via respective holes 19" and 20" and they open out the inside of the neck 15" in a shouldered portion 15a" thereof that extends from its base and that is shaped to enable the control rods 3b" and 4b" to slide parallel to the axis X.

The head 16" differs from the head 16 described above with reference to FIG. 1 in the shape of the tubular skirt 21" in contact with the radially inner surface of the neck 15". More precisely, the tubular skirt 21" has a shoulder at 21a" in the bottom portion thereof over one-half of its periphery so as to cooperate with the shouldered portion 15a" of the neck 15" to form a semi-annular groove [23"] *27"* in which the control rods 3b" or 4b" can slide freely. The tubular skirt 21" is provided over half of its outside circumference with a rib 21b" constituting a bearing surface designed to thrust axially on the end edge 3c" or 4c" of one of the control rods 3b" or 4b" when the cap 9" is pressed down on the receptacle 2". The channels formed inside the control rods are referenced 3d" and 4d". The portion of the tubular skirt 21" extending facing the shouldered portion 15a" of the neck 15" includes at least one opening [27"] *21c"*, which is preferably situated vertically beneath the non-return valve 28 fitted to the dispensing head 16" for allowing the substance that leaves the control rod against which the tubular skirt 21" is pressing via the rib 21b" so as to go *through channel 23"* towards the dispensing orifice *24* fitted with the non-return valve 28. The radially outer annular surface of the tubular skirt 21" situated above the shoulder 21a" presses in leakproof manner against the radially inner annular surface of the neck 15" situated above the shouldered portion 15a".

To dispense the substance contained in one of the containers 3" or 4", the user rotates the dispensing head 16" so as to position the rib 21b" over the control rod 3b" or 4b" corresponding to the substance to be dispensed. Both control rods 3b" and 4b" are returned towards their fully-deployed rest position by resilient return means included in the pumps 3a" and 3b".

Under the return action of the control rod pressing against the rib 21b", the cover 9" is pushed into abutment by the bead 12" against the top end of the annular groove 11". To dispense a quantity of substance, the user presses the dispensing head 16" so as to cause the cover 9" to move down onto the receptacle 2". As the cover 9" moves down, the rib 21b" presses against one of the control rods (the control rod 3b" as shown in FIG. 3), while the other control rod is free to penetrate unhindered into the annular groove [23"] *27"* and therefore remains in its deployed, rest position.

When the corresponding control rod is pressed down, a predetermined quantity of substance is expelled via the corresponding channel 3d" or 4d", which constitutes a compartment outlet in the context of the present invention.

Naturally, the invention is not limited to the three embodiments described above.

In particular, it is possible within the invention to provide a device for dispensing more than two substances as alternatives, or for dispensing substances other than lotions for providing protection against exposure to the sun.

The receptacle used for packaging the substances may be of various shapes, and in particular it may have a wall that is entirely flexible and elastically deformable, or in a variant it may have a wall that is rigid in some portions and flexible in others. Under such circumstances, the flexible wall is advantageously hemispherical in shape and projects outwards from the receptacle when at rest.

I claim:

1. A device for packaging and dispensing substances in liquid, gel, or paste form, the device comprising a receptacle having a plurality of compartments for separately storing at least two substances, each compartment having an outlet for the substance, the device further comprising fixing means for fixing a rotary dispensing head on the receptacle to enable only the substance contained in a selected compartment corresponding to a predetermined angular position of the head to be dispensed, wherein said dispensing head includes a single dispensing channel provided at its outlet end with a non-return valve suitable for opening under the effect of thrust from upstream substance, and wherein said dispensing head is shaped to establish selective communication between the outlet of said selected compartment and said dispensing channel.

2. A device according to claim 1, wherein said non-return valve is of the type that allows ingress of air.

3. A device according to claim 1, wherein said non-return valve is situated substantially flush with the outside surface of the dispensing head.

4. A device according to claim 1, wherein said non-return valve is made by overmolding an elastomer.

5. A device according to claim 1, wherein said dispensing head is suitable for taking up a closure angular position in which the dispensing channel is isolated from said outlets.

6. A device according to claim 1, wherein said fixing means comprise a cover having an outlet tubular skirt for snapping onto the receptacle, and a neck for rotatably receiving the dispensing head, the cover having orifices passing therethrough and communicating respectively in sealed manner with said outlets and opening out to the inside of the neck at locations that are angularly spaced apart.

7. A device according to claim 6, wherein said orifices are constituted by recesses formed in the inside face of the neck at its base.

8. A device according to claim 6, wherein the cover includes annular sealing lips that engage in said openings respectively when the cover is in position on the receptacle.

9. A device according to claim 1, wherein the receptacle has at least a portion of its wall that is flexible so as to enable the user to expel substance by pressing on said wall.

10. A device according to claim 9, wherein said portion of the wall which is flexible is a portion that is elastically deformable.

11. A method for packaging and dispensing substances comprising filling a device according to claim 1 with a first and second lotions having different sun protection factors, said first and second lotions being filled in different compartments in said device.

12. A device for packaging and dispensing substances in liquid, gel, or paste form the device comprising a receptacle having a plurality of compartments for separately storing at least two substances, each compartment having an outlet for the substance, the device further comprising fixing means for fixing a rotary dispensing head on the receptacle to enable only the substance contained in a selected compartment corresponding to a predetermined angular position of the head to be dispensed, wherein said dispensing head includes a single dispensing channel provided at its outlet end with a non-return valve suitable for opening under the effect of thrust from upstream substance, and wherein said dispensing head is shaped for exerting selective action on means for extracting substance and associated with said selected compartment.

13. A device for packaging and dispensing substances in liquid, gel, or paste form, the device comprising a receptacle having a plurality of compartments for separately storing at least two substances, each compartment having an outlet for the substance, the device further comprising fixing means for fixing a rotary dispensing head on the receptacle to enable only the substance contained in a selected compartment corresponding to a predetermined angular position of the head to be dispensed, wherein said dispensing head includes a single dispensing channel provided at its outlet end with a non-return valve suitable for opening under the effect of thrust from upstream substance, wherein said dispensing head is shaped to establish selective communication between the outlet of said selected compartment and said dispensing channel, and wherein said dispensing head is shaped for exerting selective action on means for extracting substance and associated with said selected compartment.

14. A device for packaging and dispensing substances in liquid, gel, or paste form, the device comprising a receptacle having a plurality of compartments for separately storing at least two substances, each compartment having an outlet for the substance, the device further comprising fixing means for fixing a rotary dispensing head on the receptacle to enable only the substance contained in a selected compartment corresponding to a predetermined angular position of the head to be dispensed, wherein said dispensing head includes a single dispensing channel provided at its outlet end with a non-return valve suitable for opening under the effect of thrust from upstream substance, wherein said dispensing head is shaped for exerting selective action on means for extracting substance and associated with said selected compartment, wherein said fixing means for fixing the rotary dispensing head on the receptacle enable the head to move axially along its axis of rotation, and wherein said outlets for substance are situated on hollow control rods which, by being depressed, act on extraction means suitable for causing substance to be expelled.

15. A device according to claim [1] *14*, wherein said control rods are associated with respective pumps suitable for dispensing a measured quantity of substance on each depression of the control rod.

*16. A device for dispensing substances in liquid, gel, or paste form, the device comprising:*

*a receptacle including at least*

*a first compartment configured to contain a first substance and including a first outlet for the first substance, and*

*a second compartment configured to contain a second substance separately from the first substance and including a second outlet for the second substance; and*

*a dispensing head including*

*a dispensing channel,*

*an outlet, and*

*a valve configured to open in response to substance flow from the first and second compartments;*

*wherein the dispensing head is configured to be movable between a first compartment dispensing position and a second compartment dispensing position, the dispensing head being configured to dispense, via the dispensing channel, only the first substance from the first compartment when in the first compartment dispensing position and only the second substance from the second compartment when in the second compartment dispensing position, and*

*wherein the dispensing head is configured to prevent simultaneous dispensing from the first and second compartments.*

*17. The device of claim 16, wherein the dispensing head is rotatably movable between the first and second compartment dispensing positions.*

*18. The device of claim 16, wherein the dispensing head is configured so that the dispensing channel is placed in flow communication with the first outlet when the dispensing head is in the first compartment dispensing position and in flow communication with the second outlet when the dispensing head is in the second compartment dispensing position.*

*19. The device of claim 16, wherein the dispensing head is also movable to a closure position wherein the dispensing channel lacks flow communication with the first and second compartments.*

*20. The device of claim 16, wherein the receptacle includes a flexible portion configured to be pressed to expel substance from one of the first and second compartments.*

*21. The device of claim 16, further comprising fixing means for fixing the dispensing head on the receptacle.*

*22. The device of claim 16, wherein the dispensing head outlet is provided at an end of the dispensing channel, and wherein the valve is provided at the dispensing head outlet.*

*23. The device of claim 22, wherein the valve is configured to prevent passage of contaminants into the device via the dispensing head outlet.*

*24. The device of claim 22, wherein the valve is configured to allow ingress of air.*

*25. The device of claim 16, further comprising a first pump associated with the first compartment and a second pump associated with the second compartment, wherein the device is configured to actuate only the first pump when the dispensing head is in the first compartment dispensing position and only the second pump when the dispensing head is in the second compartment dispensing position.*

*26. The device of claim 25, wherein the first pump includes a first hollow control rod including the first outlet and the second pump includes a second hollow control rod including the second outlet, each of the first and second pumps being configured to be actuated by moving their respective hollow control rod.*

*27. The device of claim 26, wherein the dispensing head is rotably movable between the first and second compartment dispensing positions, and wherein the dispensing head is axially movable to cause actuation of one of the first and second pumps.*

*28. The device of claim 16, wherein the first substance is contained in the first compartment and the second substance is contained in the second compartment.*

*29. The device of claim 28, wherein the first and second substances are cosmetic products.*

*30. The device of claim 29, wherein the first and second substances are sun protection products having differing sun protection factors.*

*31. The device of claim 29, wherein the first substance is a sun protection product and the second substance is an after-sun product.*

*32. The device of claim 16, further comprising a mount configured to mount the dispensing head on the receptacle.*

*33. The device of claim 32, wherein the mount is a cover including a skirt provided on the receptacle and a neck movably receiving the dispensing head.*

*34. The device of claim 33, wherein the dispensing head is rotatably received on the neck.*

*35. The device of claim 34, wherein the dispensing head and the neck are coupled via a cooperating bead and groove.*

*36. The device of claim 33, wherein the neck includes a first orifice in flow communication with the first outlet and a second orifice in flow communication with the second outlet, and wherein the dispensing head includes an opening providing substance flow to the dispensing channel, the opening being in flow communication with the first orifice when the dispensing head is in the first compartment dispensing position and being in flow communication with the second orifice when the dispensing head is in the second compartment dispensing position.*

*37. The device of claim 36, wherein the dispensing head is rotatably received on the neck.*

*38. The device of claim 33, wherein the skirt is coupled to the receptacle.*

*39. The device of claim 33, wherein the skirt and the receptacle are coupled via a cooperating bead and groove.*

*40. A method of selectively dispensing a substance, comprising:*

*providing the device according to claim 16, wherein a first substance is contained in the first compartment and a second substance is contained in the second compartment;*

*selecting a compartment from which to dispense a substance;*

*moving the dispensing head to one of the first and second compartment dispensing positions corresponding to the selected compartment; and*

*dispensing the substance from the selected compartment.*

*41. The method of claim 40, wherein the moving of the dispensing head includes rotating the dispensing head.*

*42. The method of claim 40, further comprising axially displacing the dispensing head.*

*43. The method of claim 40, wherein the first and second substances are cosmetic products.*

*44. The method of claim 43, wherein the first and second substances are sun protection products having differing sun protection factors.*

*45. The method of claim 43, the first substance is a sun protection product and the second substance is an after-sun product.*

*46. A device for dispensing substances in liquid, gel, or paste form, the device comprising:*

*a receptacle including at least*

*a first compartment configured to contain a first substance and including*

*a first pump, and*

*a first outlet for the first substance, and*

*a second compartment configured to contain a second substance separately from the first substance and including*

*a second pump, and*

*a second outlet for the second substance; and*

*a dispensing head configured to be movable between a first compartment dispensing position and a second compartment dispensing position, the dispensing head being configured to actuate the first pump and dispense only the first substance from the first compartment when in the first compartment dispensing position and to actuate the second pump and dispense only the second substance from the second compartment when in the second compartment dispensing position, and*

*wherein the dispensing head is configured to prevent simultaneous dispensing from the first and second compartments.*

*47. The device of claim 46, wherein the first pump includes a first hollow control rod including the first outlet and the second pump includes a second hollow control rod including the second outlet, each of the first and second*

*pumps being configured to be actuated by moving their respective hollow control rod.*

*48. The device of claim 46, wherein the dispensing head is rotatbly movable between the first and second compartment dispensing positions.*

*49. The device of claim 46, wherein the dispensing head is axially movable to cause actuation of one of the first and second pumps.*

*50. The device of claim 46, wherein the dispensing head includes an element for contacting one of the first and second pumps to cause pump actuation when in one of the first and second compartment dispensing positions.*

*51. The device of claim 46, further comprising fixing means for fixing the dispensing head on the receptacle.*

*52. The device of claim 46, wherein the dispensing head includes a dispensing channel configured to be placed in flow communication with the first pump when the dispensing head is in the first compartment dispensing position and in flow communication with the second pump when the dispensing head is in the second compartment dispensing position.*

*53. The device of claim 52, wherein the dispensing head includes an outlet in fluid communication with the channel and a valve at the outlet, the valve being configured to open in response to substance flow in the channel.*

*54. The device of claim 53, wherein the valve is configured to prevent passage of contaminants into the device via the dispensing head outlet.*

*55. The device of claim 53, wherein the valve is configured to allow ingress of air.*

*56. A method of selectively dispensing a substance, comprising:*

*providing the device according to claim 46, wherein a first substance is contained in the first compartment and a second substance is contained in the second compartment;*

*selecting a compartment from which to dispense a substance;*

*moving the dispensing head to one of the first and second compartment dispensing positions corresponding to the selected compartment; and*

*dispensing the substance from the selected compartment.*

*57. The method of claim 56, wherein the moving of the dispensing head includes rotating the dispensing head.*

*58. The method of claim 56, further comprising axially displacing the dispensing head.*

*59. The method of claim 56, wherein the first and second substances are cosmetic products.*

*60. The method of claim 59, wherein the first and second substances are sun protection products having differing sun protection factors.*

*61. The method of claim 59, the first substance is a sun protection product and the second substance is an after-sun product.*

* * * * *

UNITED STATES PATENT AND TRADEMARK OFFICE

CERTIFICATE OF CORRECTION

PATENT NO. : RE 38,328 E
DATED : November 25, 2003
INVENTOR(S) : Jean-Louis H. Gueret It is certified that error appears in the above-identified patent and that said Letters Patent is hereby corrected as shown below:

Column 7,
Line 54, replace "form the" with -- form, the --;

Column 10,
Line 13, replace "*claim 33,*" with -- *claim 38*, --;
Line 37, replace "*claim 43, the*" with -- *claim 43, wherein the* --; and Column 12,
Line 24, replace "*claim 59, the*" with -- *claim 59, wherein the* --.

Signed and Sealed this

Sixth Day of April, 2004

JON W. DUDAS
*Acting Director of the United States Patent and Trademark Office*